United States Patent [19]

Engelsmann et al.

[11] 3,750,548

[45] Aug. 7, 1973

[54] PHOTOGRAPHIC APPARATUS FOR USE WITH PERCUSSIVE FLASH DEVICES

[75] Inventors: Dieter Engelsmann, Unterhaching; Horst Karl, Munich, both of Germany

[73] Assignee: Agfa-Gevaert AG, Leverkusen, Germany

[22] Filed: Aug. 30, 1971

[21] Appl. No.: 176,123

[30] Foreign Application Priority Data

Aug. 31, 1971 Germany .................. P 20 43 145.2

[52] U.S. Cl. ............................................. 95/11 R
[51] Int. Cl. ........................................... G03b 19/02
[58] Field of Search ..................... 95/11 R, 11.5 R

[56] References Cited
UNITED STATES PATENTS

| 3,624,727 | 11/1971 | Horton et al. ................ 95/11 R X |
| 3,624,726 | 11/1971 | Horton et al. ................ 95/11 R |
| 3,589,849 | 6/1971 | Sturm et al. ................ 95/11.5 R |
| 3,602,618 | 8/1971 | Michatek ................ 95/11.5 R |
| 3,630,129 | 12/1971 | Gow et al. ................ 95/11.5 R |
| 3,630,131 | 12/1971 | Harvey ................ 95/11 R |

*Primary Examiner*—Samuel S. Matthews
*Assistant Examiner*—Kenneth C. Hutchison
*Attorney*—Michael S. Striker

[57] ABSTRACT

A striker which dwells in its energized position and forms part of a percussion flash device is engaged by a sensing lever when the flash device is properly attached to the housing of a camera. The sensing lever thereby allows a pawl to maintain the flag of a signaling lever out of the viewfinder. When the striker leaves its energized position to fire a flash lamp, the sensing lever is free to pivot under the action of a spring and disengages the pawl from the signaling lever so that the flag moves into the viewfinder under the action of a second spring. A resetting lever is pivoted by a third spring in response to detachment of the flash device from the housing to thereby expel the flag from the viewfinder by way of the sensing lever.

17 Claims, 1 Drawing Figure

PATENTED AUG 7 1973 3,750,548
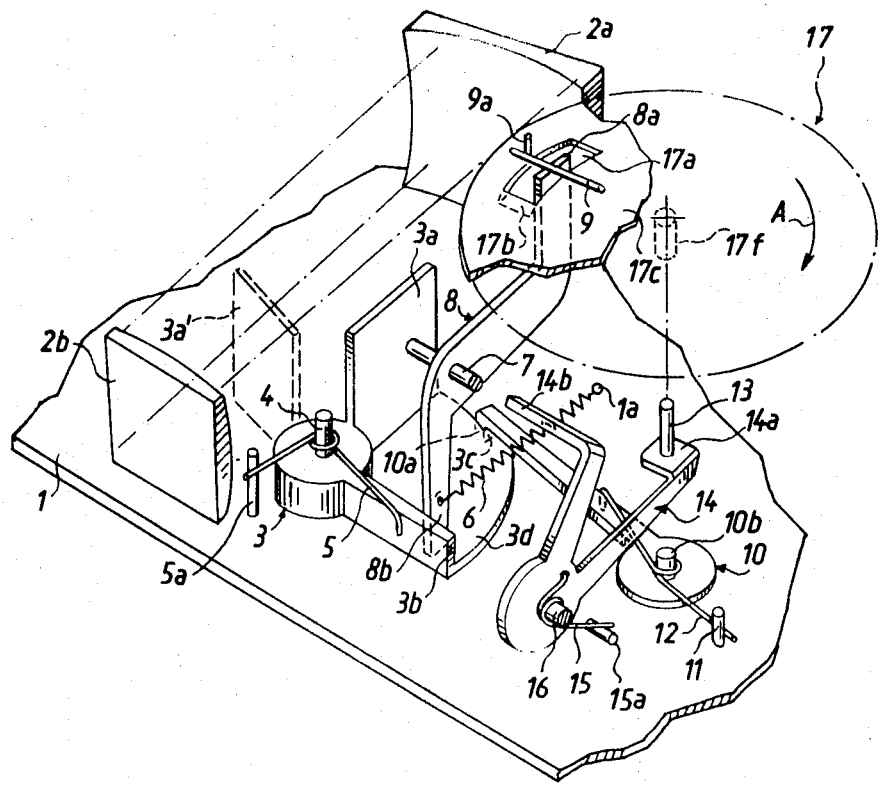
INVENTOR
DIETER ENGELSMANN
HORST KARL
BY Michael S. Striker
ATTORNEY

PHOTOGRAPHIC APPARATUS FOR USE WITH PERCUSSIVE FLASH DEVICES

BACKGROUND OF THE INVENTION

The present invention relates to photographic apparatus in general, especially to still cameras, and more particularly to improvements in photographic apparatus which can utilize so-called percussive flash devices having one or more flash lamps which can be fired by releasing suitably configurated strikers from their energized positions. An advantage of such flash devices is that the firing of their lamps does not necessitate the consumption of electrical energy so that they can be used in or with photographic apparatus which need not contain batteries, cells or like energy sources.

A drawback of presently known photographic apparatus for use with percussive flash devices is that they do not embody any means for indicating or signaling whether or not the flash device still contains one or more unfired flash lamps or that, if they do have an indicating or signaling device, the latter is bulky, complicated, costly and unreliable if the manufacturing tolerances of successively employed flash devices exceed a very narrow range.

Another drawback of many presently known photographic apparatus for use with percussive flash devices is that the signaling means must be set or reset whenever a fresh flash device is attached to or whenever a spent or partially spent flash device is detached from the housing of the photographic apparatus.

SUMMARY OF THE INVENTION

An object of the present invention is to provide a photographic appartus for use with percussive flash devices which contain one or more flash lamps with novel and improved means for signaling or indicating to the user whether or not the flash device which happens to be attached to the housing of the photographic apparatus contains any unfired flash lamps as well as whether or not an unfired flash lamp is in an optimum position for illumination of the subject.

Another object of the invention is to provide the photographic apparatus with signaling means which, in addition to the just outlined features, is further capable of responding to attachment or detachment of a percussive flash device and of thereby indicating whether the freshly attached flash device contains any unfired flash lamps or whether a partially spent flash device has been attached in such a way that the flash lamp which faces the subject is fired or unfired.

A further object of the invention is to provide the photographic apparatus with signaling means whose functioning is not affected by minor or substantial tolerances in the construction and assembly of component parts of percussive flash devices.

An additional object of the invention is to provide a photographic apparatus which embodies the above outlined indicating means and is capable of accepting commercially available or specially designed percussive flash devices.

The invention is embodied in a photographic apparatus which comprises a housing or body, a percussive flash device which is preferably movable with reference to the housing between attached and detached positions and is preferably indexible in the attached position between a series of predetermined angular positions (preferably four equidistant positions), at least one striker or an analogous firing element provided in or on the flash device and being movable from a stressed or energized position to thereby effect the generation of artificial light, for example, by directly or indirectly firing a flash lamp or by actuating an electronic flash by way of a piezoelectric element or the like, signaling means mounted in the housing and having a preferably flag-shaped portion movable between an operative and an inoperative position (for example, the flag-shaped portion can be mounted for movement to an operative position in which it can be seen in the viewfinder of the photographic apparatus), and sensing means mounted in the housing for movement between first and second positions. In its first position, the sensing means engages a firing element which dwells in the energized position to thereby maintain the flag-shaped portion of the signaling means in the inoperative position. The sensing means is free to move to its second position (preferably under the action of a spring or analogous biasing means) in response to movement of the scanned firing element from its energized position (such movement of the firing element from energized position can take place shortly or immediately prior to or practically simultaneously with generation of artificial light) whereby the sensing means causes or permits the flag-shaped portion of the signaling means to assume its operative position.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary perspective view of a portion of a photographic apparatus which embodies the invention, further showing a portion of a percussive flash device.

DESCRIPTION OF THE PREFERRED EMBODIMENTS

The drawing illustrates a portion of a photographic apparatus (preferably a still camera) which includes a housing or body 1 with a built-in viewfinder having front and rear lenses 2a, 2b. An upright pivot pin 4 which is mounted in the housing 1 defines a pivot axis for a signaling lever 3 which has two portions or arms 3a, 3b and a plate-like portion 3d extending between the arms 3a, 3b and provided in its edge face with a retaining notch 3c. The arm 3a constitutes an indicator or flag which can be moved from the retracted or inoperative position shown by solid lines to the exposed or operative position 3a' which is indicated by broken lines. In such exposed or operative position, the flag 3a extends partially into the space between the lenses 2a, 2b so that it can be readily seen by the user of the camera when the user looks through the viewfinder to observe the subject or scene to be photographed.

The signaling lever 3 is held in the illustrated position by a locking pawl 10 having a projection or tooth 10a which extends into the notch 3c of the plate-like portion 3d. A biasing means, here shown as a torsion spring 5, which is convoluted around the pivot pin 4 serves as a means for biasing the signaling lever 3 to the other end position in which the flag 3a assumes the operative position 3a'. One leg of the spring 5 bears against a post 5a in the housing 1 and its other leg is suitably bent to engage the arm 3b of the signaling lever 3.

A sensing lever 8 is pivotable in the housing 1 about the axis of a horizontal shaft 7 which is normal to and crosses in space with the pivot pin 4. The upper arm 8a of the sensing lever 8 is shown in non-releasing engagement with one of several (preferably four) equidistant firing elements or strikers 9 provided in a percussive flash device 17. The striker 9 is lodged in its energized position in which it abuts against a stop 9a in the casing 17c of the flash device 17. A helical spring 6 is anchored in the housing 1, as at 1a, and is attached to a second or lower arm 8b of the sensing lever 8 so as to urge the arm 8a into non-releasing engagement with the striker 9. When the flash lamp which is associated with the illustrated striker 9 is to be fired, the striker is disengaged from the respective stop 9a and is free to fire the respective lamp by striking against a cartridge or the like, not shown. The spring 6 is then free to contract and moves the arm 8a through an aperture 17a in the bottom wall of the casing 17c of the flash device 17 so that the arm 8b moves away from the arm 3b of the signaling lever 3 and the spring 5 is free to pivot the lever 3 in a counterclockwise direction whereby the flag 3a assumes the exposed or operative position 3a'. This indicates to the user that the next exposure with artificial illumination of the subject can be made only by indexing the flash device 17 through a predetermined angle, preferably through 90°, in order to move the next unfired flash lamp into an optimum position for illumination of the subject.

The movement of the arm 8b away from the arm 3b of the signaling lever 3 does not immediately result in movement of the flag 3a to the operative position 3a'. The arm 8b must be pivoted by the spring 6 to such an extent that it disengages the locking pawl 10 from the plate-like portion 3d of the signaling lever 3, i.e., that it expels the projection or tooth 10a from the notch 3c. This enables the torsion spring 5 to pivot the signaling lever 3 in a counterclockwise direction.

If the user of the camera wishes to make the next exposure with artificial illumination of the subject, the flash device 17 is indexed in a clockwise direction as indicated by the arrow A, either by hand or automatically (for example, in response to actuation of the film transporting mechanism, not shown). The arm 8a of the sensing lever 8 is then automatically pivoted by the casing 17c of the flash device 17 so that the lever 8 turns in a clockwise direction, as viewed in the drawing, and its arm 8b engages the arm 3b to stress the spring 5 and to return the signaling lever 3 to the illustrated position whereby the locking pawl 10 causes its projection 10a to reenter the notch 3c and to thus hold the signaling lever 3 in the position in which the flag 3a cannot be seen in the viewfinder. It is preferred to provide adjacent to each aperture 17a an inclined cam face or guide face 17b along which the arm 8a of the sensing lever 8 slides while the flash device 17 is being indexed to the next position. The locking pawl 10 is pivotable on an upright pin 10b of the housing 1 and is biased in a counterclockwise direction, as viewed in the drawing, by a torsion spring 12 one leg of which bears against a fixed post 11.

In order to insure that the signaling lever 3 automatically reassumes the illustrated position in which the flag 3a does not extend into the viewfinder, the photographic apparatus is further provided with resetting means for automatically pivoting the lever 3 clockwise in response to detachment of the flash device 17. To this end, the casing 17c of the flash device 17 comprises a foot 17f which is receivable in a suitable socket (not shown) in or on the top wall of the housing 1 and thereby depresses a motion transmitting pin 13 mounted on a platform 14a provided on one arm of a resetting lever 14. The latter is pivotable about the axis of a horizontal pin 16 which is mounted in the housing 1. A torsion spring 15 which is convoluted about the pivot pin 16 reacts against a stationary post 15a and bears against the resetting lever 14 to bias the latter in a counterclockwise direction, as viewed in the drawing, as soon as the foot 17f is withdrawn from the socket to permit the motion transmitting pin 13 to move upwardly. The L-shaped second arm 14b of the resetting lever 14 then engages the arm 8b of the sensing lever 8 and causes the arm 8b to pivot the signaling lever 3 against the opposition of the spring 5 until the projection 10a of the locking pawl 10 reenters the notch 3c under the action of the spring 12. As soon as a fresh flash device 17 is properly attached to the housing 1, the foot 17f of such flash device depresses the motion transmitting pin 13 and causes the resetting lever 14 to pivot to the illustrated inactive position in which the arm 14b is disengaged from the arm 8b. However, the flag 3a remains in the retracted position because the arm 3b is held by the arm 8b of the sensing lever 8 provided that the arm 8a encounters a striker 9 which dwells in the energized position, i.e., which abuts against the associated stop 9a. The striker 9 is preferably a wire consisting of elastomeric material, such as spring steel.

Since the sensing lever 8 must turn through a substantial angle during movement from engagement with the arm 3b of the signaling lever 3 into engagement with the locking pawl 10, and since the arm 8b is thereupon out of the way so that it cannot interfere with movement of the lever 3 to that position in which the flag 3a is observable in the viewfinder, the structure of the present invention operates reliably even if the positions of all strikers 9 in a flash device 17 are not identical and even if the position of one or more strikers in a flash device 17 deviates substantially from the position of the striker 9 shown in the drawing. In other words, the reliability of signals furnished by the flag 3a (which serves to indicate that the flash device 17 is detached from the housing 1, that the flash device is attached but that a fired flash lamp faces the subject, or that the flash device 17 is attached and that a fresh (unfired) flash lamp faces the subject) is not dependent on tolerances in the manufacture of the flash device 17, especially on tolerances in the mounting and positioning of strikers 9. All that counts is that, when an unfired flash lamp faces the subject, the associated striker 9 should dwell in such position that it can be engaged by the arm 8a and can hold the sensing lever 8 in a position in which the arm 8b does not disengage the pawl 10 from the portion 3d of the signaling lever 3. The torsion spring 12 is preferably weak, i.e., substantially weaker than the helical spring 6, so that the arm 8b will invariably disengage the locking pawl 10 from the signaling lever 3 when the spring 6 is free to contract sufficiently to move the arm 8b against the pawl 10. The spring 5 is then free to turn the signaling lever 3 in a counterclockwise direction, as viewed in the drawing, so that the flag 3a is caused to assume the operative position 3a'. A suitable stop or the like (not shown) is preferably provided to automatically arrest the signaling lever 3 when the arm or flag 3a reaches the operative position 3a'. The arm 14b of the resetting lever 14 can constitute such a stop by extending into the path of movement of the arm 3b when the signaling lever 3 is being pivoted by the spring 5.

The casing 17c of the flash device 17 is assumed to be provided with four equidistant apertures 17a and with four firing elements or strikers 9. Each such striker 9 is accessible by way of a different aperture 17. The casing 17c is indexible with reference to the housing 1 in the illustrated attached position of the flash device 17.

It is clear that the improved photographic apparatus is susceptible of many modifications without departing from the spirit of the invention. For example, the sensing lever 8 may also serve as a means for disengaging the adjacent firing element or striker 9 from the associated stop 9a to thus effect the firing of a flash lamp in response to actuation of the customary release means, not shown. However, it is equally possible to provide the photographic apparatus with discrete disengaging means which can move a striker 9 from its energized position independently of the sensing lever 8. Also, the pivotable resetting means 14 can be replaced by reciprocable resetting means and the same holds true for the signaling means 3 and/or sensing means 8.

The resetting lever 14 constitutes a desirable optional feature of the photographic apparatus; it insures that the flash device 17 and/or the sensing lever 8 cannot be damaged during attachment of the flash device.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

We claim:

1. In a photographic apparatus, the combination of a percussive flash device having at least one firing element movable from an energized position to thereby effect the generation of artificial light; a housing supporting said flash device; signalling means mounted in said housing and having a portion movable from an inoperative position to a spaced-apart operative position; sensing means mounted in said housing for movement between a first position in which said sensing means engages said firing element in the energized position thereof and prevents the movement of said portion of said signalling means from said inoperative position, and a second position in response to movement of said firing element from said energized position; and means for causing movement of said portion of said signalling means from said inoperative position and all the way to said spaced-apart operative position in response to and after completed movement of said sensing means to said second position so that said portion of said signalling means then indicates that the firing element has left said energized position.

2. The combination as defined in claim 1, further comprising biasing means mounted in said housing and arranged to urge said sensing means to said second position thereof.

3. The combination as defined in claim 1, wherein said means for moving said portion of said signaling means to said operative position comprises biasing means mounted in said housing.

4. The combination as defined in claim 1, wherein said flash device is movable with reference to said housing between a plurality of predetermined positions and comprises a plurality of firing elements each of which is engageable by said sensing means in the respective position of said flash device.

5. The combination as defined in claim 4, wherein said flash device comprises a casing provided with guide means for effecting the movement of said sensing means from said second toward said first position in response to movement of said flash device from a preceeding predetermined position toward the next-following predetermined position.

6. The combination as defined in claim 5, wherein said sensing means comprises a lever which is pivotable in said housing between said first and second positions thereof, and further comprising biasing means mounted in said housing and arranged to urge said lever to said second position so that said biasing means is caused to store energy when said guide means moves said lever from said second toward said first position thereof.

7. The combination as defined in claim 6, wherein said lever has a first arm which engages a firing element in said first position of said lever and while such firing element dwells in said energized position and a second arm engaging a second portion of said signaling means to thereby maintain said first mentioned portion of said signaling means in said inoperative position while said first arm engages a firing element in the energized position of such firing element.

8. The combination as defined in claim 7, wherein said signaling means comprises a second lever which is pivotable in said housing to thereby move said first mentioned portion between said operative and inoperative positions, said second lever comprising first and second arms which respectively constitute said first mentioned and said second portions of said signaling means.

9. The combination as defined in claim 1, further comprising locking means mounted in said housing and normally engaging said signaling means to thereby maintain said portion of said signaling means in said inoperative position, said sensing means being arranged to disengage said locking means from said signaling means in response to movement from said first to said second position thereby whereupon said moving means is free to move said portion of said signaling means to said spaced apart operative position.

10. The combination as defined in claim 9, wherein said sensing means comprises a lever which is pivotable with reference to said housing between said first and second positions and said locking means comprises a pawl which is pivotable in said housing into and from engagement with said signaling means while said portion dwells in said inoperative position, said lever being arranged to disengage said pawl from said signaling means in response to pivotal movement toward said second position thereof.

11. The combination as defined in claim 9, wherein said sensing means is remote from said locking means in said first position thereof.

12. The combination as defined in claim 1, wherein said flash device is movable with reference to said housing between an attached and a detached position, and further comprising resetting means mounted in said housing and arranged to move said portion of said signaling means to said inoperative position in response to movement of said flash device from said attached position.

13. The combination as defined in claim 12, wherein said resetting means is arranged to move said portion of said signaling means by way of said sensing means so that said sensing means is caused to dwell in said first position thereof in response to attachment of said flash device to said housing.

14. The combination as defined in claim 13, wherein said resetting means comprises a lever which is pivotable in said housing and said flash device comprises a portion arranged to pivot said lever away from engagement with said sensing means in response to attachment of said flash device so that said sensing means is thereupon free to move from said first to said second position in the absence of engagement with a firing element in the energized position of such firing element.

15. The combination as defined in claim 14, wherein said flash device is indexible with reference to said housing in said attached position thereof and comprises a plurality of firing elements each adapted to be placed into the path of movement of said sensing means from said first to said second position in response to indexing of said flash device.

16. The combination as defined in claim 14, further comprising first biasing means mounted in said housing and arranged to urge said sensing means toward said second position and second biasing means mounted in said housing and arranged to urge said resetting means against said portion of said flash device.

17. The combination as defined in claim 1, further comprising view finder means provided in said housing, said portion of said signaling means being observable in said view finder means in said operative position thereof.

* * * * *